(12) United States Patent
Arzberger et al.

(10) Patent No.: US 7,845,154 B2
(45) Date of Patent: Dec. 7, 2010

(54) SUPPLY BELT

(75) Inventors: Maximilian Arzberger, Igenhausen (DE); Christian Herrmann, Altomünster (DE)

(73) Assignee: Bauer Maschinen GmbH, Schrobenhausen (DE)

( * ) Notice: Subject to any disclaimer, the term of this patent is extended or adjusted under 35 U.S.C. 154(b) by 954 days.

(21) Appl. No.: 11/711,106

(22) Filed: Feb. 27, 2007

(65) Prior Publication Data

US 2007/0200021 A1 Aug. 30, 2007

(30) Foreign Application Priority Data

Feb. 27, 2006 (EP) .................................. 06003950

(51) Int. Cl.
*F16G 13/00* (2006.01)
*F16G 13/16* (2006.01)
*E02F 5/02* (2006.01)

(52) U.S. Cl. .............................. 59/78.1; 248/49; 248/51
(58) Field of Classification Search ...................... 59/78, 59/78.1; 248/49, 51
See application file for complete search history.

(56) References Cited

U.S. PATENT DOCUMENTS

| 3,157,376 | A |  | 11/1964 | Merker et al. |
| 4,186,553 | A | * | 2/1980 | Fitchett ....................... 59/78.1 |
| 5,134,251 | A | * | 7/1992 | Martin ....................... 174/136 |
| 6,367,238 | B1 | * | 4/2002 | Fischer ....................... 59/78.1 |
| 6,374,589 | B1 | * | 4/2002 | Kunert et al. ................. 59/78.1 |
| 6,708,480 | B1 | * | 3/2004 | Wehler ....................... 59/78.1 |
| 7,272,922 | B2 | * | 9/2007 | Fahrion ........................... 59/2 |
| 7,278,253 | B2 | * | 10/2007 | Wehler et al. ................. 59/78.1 |
| 7,484,351 | B2 | * | 2/2009 | Harada et al. ................. 59/78.1 |
| 7,673,440 | B2 | * | 3/2010 | Blase et al. ................... 59/78.1 |
| 2005/0056333 | A1 |  | 3/2005 | Utaki |

FOREIGN PATENT DOCUMENTS

| DE | 41 19 211 C1 | 12/1992 |
| DE | 198 40 012 A1 | 3/2005 |
| EP | 0518292 B1 | 10/1995 |
| EP | 0 708 270 A1 | 4/1996 |
| GB | 2096568 A | 10/1982 |

* cited by examiner

*Primary Examiner*—David B Jones
(74) *Attorney, Agent, or Firm*—Jacobson Holman PLLC

(57) ABSTRACT

The invention relates to a supply belt, in particular for the supply of a soil working device. The supply belt has at least one supply line and at least one segmental chain. This segmental chain is formed of a plurality of segments. In addition, holders are fixed to the at least one segmental chain for holding the at least one supply line. Furthermore, a supporting rope is provided, which is guided along the segmental chain in receiving spaces of the segmental chain.

13 Claims, 4 Drawing Sheets

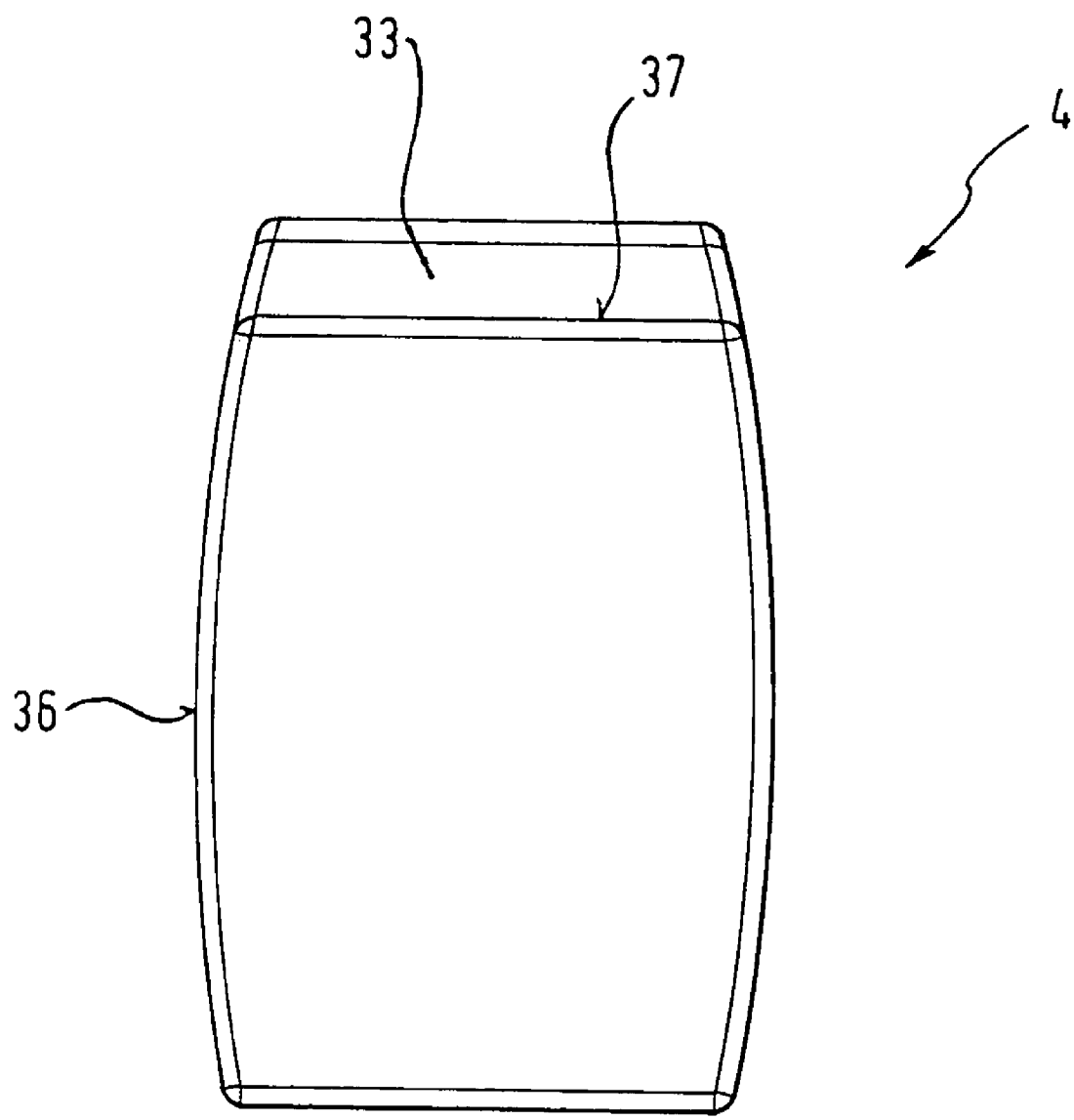

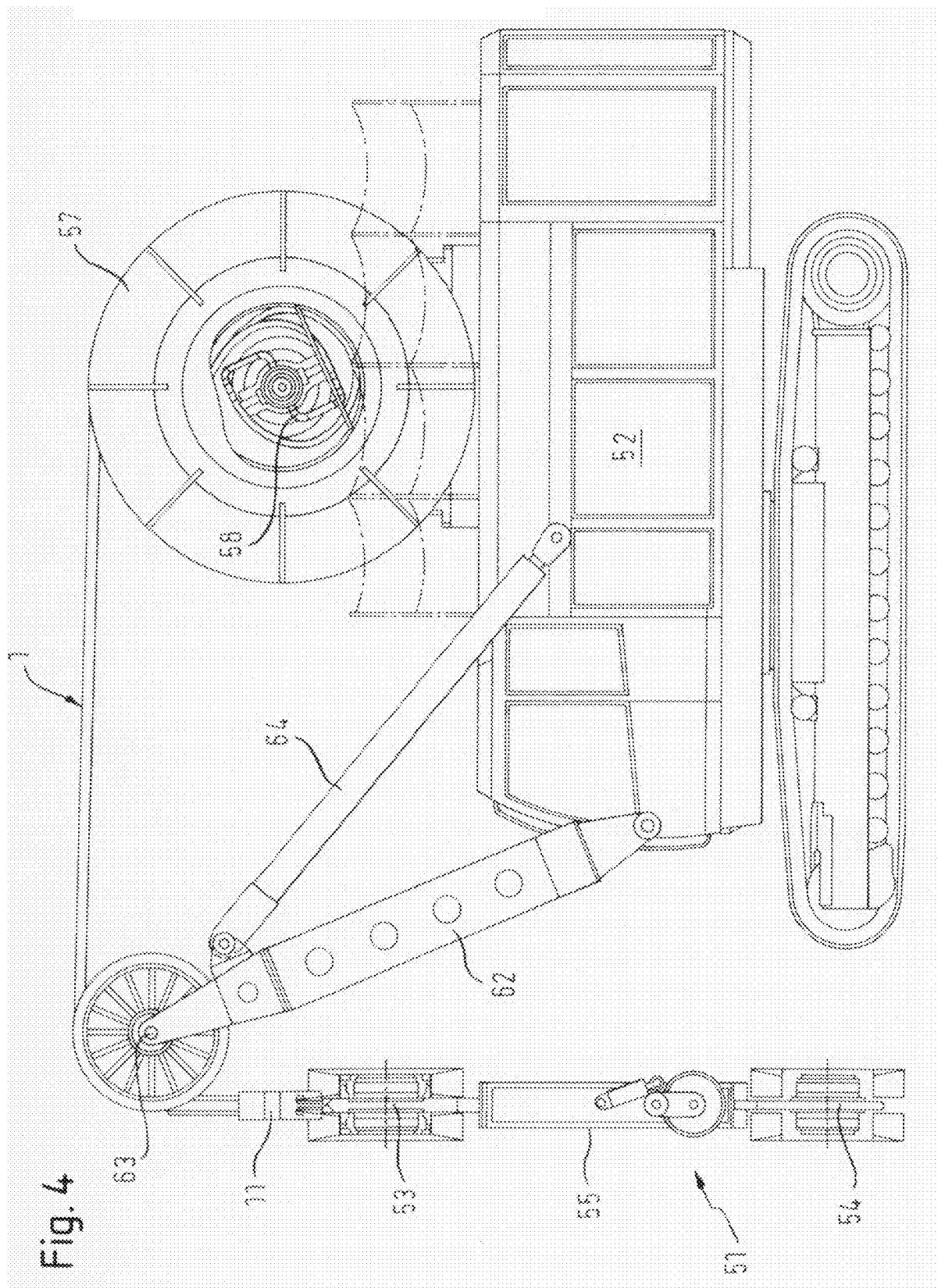

ably dimensioned winch drum suf-
SUPPLY BELT

BACKGROUND OF THE INVENTION

1. Field of the Invention

The invention relates to a supply belt, in particular for the supply of a soil working device, which comprises at least one supply line and at least one segmental chain formed of a plurality of segments, which are lined up on a guide rope. Furthermore, holders are provided which are spaced apart from each other and attached on segments of the segmental chain and designed for holding the at least one supply line along the segmental chain.

2. Description of Related Art Including Information Disclosed Under 37 CFR §§1.97 and 37 CFR 1.98

Supply belts of such kind are used for example for the power supply of trench wall cutters and are also referred to as power belts. In such case an appropriate feed drum is provided on a carrier device. The supply belt is wound onto this drum and is unwound during the sinking of the trench wall cutter for the following of the supply belt.

For the depth control of the cutter at least one supporting rope is additionally provided. For this supporting rope a further winch drum is usually provided on the carrier device. During operation of the trench wall cutter the two winch drums for the supply belt and for the supporting rope must be controlled in a synchronous manner in order to avoid undesired forces acting on the trench wall cutter. These forces might lead to a tilting of the cutter, as a result of which the trench wall about to be produced might not be set up at the desired location.

Such a supply belt for a trench wall cutter is known for instance from DE 41 19 211 C1.

BRIEF SUMMARY OF THE INVENTION

The invention is based on the object to provide a supply belt which facilitates the operation and control of a soil working device.

This object is solved by a supply belt, in particular for the supply of a soil working device, comprising at least one supply line, at least one segmental chain formed of a plurality of segments, which are lined up on a guide rope, and holders which are spaced apart from each other and attached on segments of the segmental chain and designed for holding the at least one supply line along the segmental chain, wherein at least one supporting rope is provided, which is guided in addition to the guide rope along the segmental chain in receiving spaces of the segments.

Preferred embodiments are described hereinafter in the description as well as in the Figures and their explanations.

A supply belt according to the invention is characterized in that at least one supporting rope is provided, which is guided in addition to the guide rope along the segmental chain in receiving spaces of the segmental chain.

A fundamental idea of the invention resides in the fact that it is possible to wind the supporting rope onto the same drum as the supply belt. Compared to the conventional device with two separate drums for the supply belt and for the supporting rope this bears the advantage that the support winch for the supporting rope can be dispensed with. Moreover, a separate drive for the support winch is no longer required.

In addition, this leads to the advantage that a synchronous control of the drive of the winch provided for the supporting rope and of the drive of the winch provided for the supply belt are no longer necessary. As it were, the synchronous control takes place automatically, as the supporting rope and the supply belt are located on the same winch drum.

Another advantage of the supply belt according to the invention results from a saving of weight on the carrier device of the trench wall cutter. Due to the fact that only one winch drum and one drive are needed for the supporting rope and the supply belt, the total weight of the carrier device is thereby reduced.

In principle, it is possible to equip the supply belt with any chosen number of segmental chains, as for example with only one central segmental chain on which the holders are attached centrally. However, it has proved to be of advantage if two segmental chains are provided with a supporting rope each and if the holders are designed as crosswebs that extend between the two segmental chains and connect the two segmental chains to each other. If several supporting ropes are provided, a soil working device, such as a trench wall cutter, that is fixed to the supporting ropes can be aligned on a vertical axis in a particularly stable manner and alternatively it is possible to influence this axis.

In this connection it is particularly preferred for the holders to be designed as crosswebs that extend between the two segmental chains and connect these to each other. As a result, easy mounting of the crosswebs on the segmental chains is rendered possible. By preference, the supply lines are located between the two segmental chains so that they can be retained in a particularly effective manner by the individual crosswebs. By providing at least two segmental chains the supply belt is supported in an especially stable manner against undesired twists.

Advantageously, the supply belt is wound in such a manner onto a winch drum that it is stored in a superposed fashion; i.e. in such a manner that the segmental chain is arranged stacked over itself. In a preferred embodiment the individual segments have convex lateral faces for the winding and unwinding of the segmental chain. Due to the convex lateral faces of the individual segments, during the winding or unwinding of the segmental chains on or off the winch drum, they are able to roll at low friction along the segments of the respective segmental chain that comes to rest underneath. As a result, the wear caused during the winding and unwinding of the segmental chain is reduced. Moreover, the individual segments which can also be referred to as spacers should be designed in a sufficiently stable manner in order to be able to absorb compressions stemming from the supporting rope. For this purpose the segments have a solid metal design, e.g. of steel or an aluminum alloy.

Basically, an appropriately dimensioned winch drum suffices to provide guidance during the winding of the supply belt. However, it has proved to be of advantage if the segments have guides for mutual guidance. This can be realized through appropriate form-locking elements. For instance guide grooves can be provided on an upper side of the segments and complementary guide projections can be provided on an underside. Owing to this design of the individual segments a guided winding is facilitated. In this way it is achieved that the individual segments of a supply belt come to rest on top of each other. Through this the supply lines are not squeezed by segments that might be positioned incorrectly. The mutual squeezing of the supply lines is reduced by the crosswebs.

In an advantageous embodiment the receiving spaces provided in the segments for the supporting rope are designed as through-holes. It is true that in principle other forms are equally suitable as receiving spaces but in the case of through-holes there is the advantage that the supporting rope, on being wound, comes to rest at a pre-defined position. By preference, the through-holes are designed as a double-cone, with the inner faces being shaped in a crowned or convex fashion so as to avoid pressure occurring at the edges. What is more, through-holes with an appropriate diameter offer ample protection against frictional wear in combination with extremely good guiding properties. In addition, during winding, the high rope forces can be absorbed reliably.

The supply lines can be designed for example as electric lines, electronic lines, control lines and/or conveyer lines. In most cases use is made of hydraulic lines for the supply of a soil working device. In the case of the supply belt according to the invention, however, basically any chosen kind of line type can be employed, as they remain largely unaffected either by tension or by pressure and are therefore not subject to great loads. The conveyer lines can be designed for the conveyance of fluids or suspensions in both directions, i.e. in the direction of the trench wall cutter or in the direction of the carrier device.

Basically, the supply lines can have a thickness that is dimensioned according to their type of supply. However, it is particularly advantageous for the at least one supply line to have a thickness which does not exceed a height of the spacing of the segments. Through this dimensioning the achievement is made that hardly any squeezing of the individual supply lines occurs in the wound part of the supply belt. Owing to the fact that the segments have a minimum height of spacing that defines the minimum spacing to the next layer of supply belt the achievement is made in that the individual supply lines cannot squeeze each other.

The end of the supply belt or of the supply rope or ropes can be fixed to the soil working device in any chosen way. However, it is particularly advantageous for a terminal element to be provided at least on one end of the supply belt, on which the at least one supporting rope is attached in an articulated manner. By the articulated mounting of the at least one supporting rope to a terminal element, on which the soil working device may be attached, it is achieved that loads coming from the soil working device, such as tilting or bending torques as well as shearing forces, are not transmitted—or at least only to a small degree—to the supply belt with the supporting ropes.

In principle, it is possible to lead the supply lines directly to the respective supply locations on a soil working device. However, it is particularly advantageous if the at least one supply line ends in a connection bar that is arranged on the terminal element. Following the terminal element fixed tube pipes can be provided for example. In the area of the soil working device tube pipes provide a better protection of the lines, because in most cases they have a greater stability than hose lines that can be used in the supply belt. In addition, the connection bar provides a fixed point of connection of the lines coming from the supply belt to the terminal element, on which a soil working device may be located. As a result, a simple exchange of a soil working device, for example of the trench wall cutter or of the supply belt, is rendered possible.

In this connection it is particularly advantageous for the terminal element to have at least one fastening device for mounting a working tool. By means of this fastening device for a working tool, such as e.g. a trench wall cutter, an exchange of the working tool or the supply belt can be carried out in a particularly simple manner. If the mounting is articulated, the transmission of loads such as tilting or bending torques and shearing forces from the working device to the supply belt is reduced or prevented completely.

It is especially advantageous for the crosswebs to be rigidly connected to the supporting rope. Hence, with two segmental chains that have a supporting rope each a structure similar to that of a ladder is created with the crosswebs functioning as rungs. If the supply lines, as for example hoses, are fixed to the crosswebs it is therefore possible that the weight of the hoses is completely borne by the supporting rope. In addition, the hoses can be relieved to a large degree from tension. The hoses can be fixed to the crosswebs e.g. by means of clamps that allow a small range of movement.

To this end it is advisable to use two clamps, one located at the supply line above the crossweb and the other located below the crossweb.

It is particularly preferred if a soil working device, especially a trench wall cutter, is equipped with a supply belt in accordance with the invention. In this case the described advantages can be applied to the soil working device in a particularly simple manner.

In principle, the winch with the winch drum for the supply belt and the supporting rope can be fixed at any chosen location suitable for this purpose. It is particularly preferred to provide a winch with a winch drum for the supply belt on the soil working device or respectively on its carrier device. As a result, the mobility of the soil working device is improved, since there is no need for a winch with a winch drum to be set up separately before actual usage can be commenced. However, under confined spatial conditions a separate winch with a winch drum can also be employed in an advantageous manner.

In a particularly preferred soil working device the terminal element is designed as a rocker which is pivotably arranged at an upper point of articulation of a device frame. Through the pivotal linking of the device frame to the rocker a transmission of loads in the direction to the supply belt is reduced. To this end it is particularly advantageous if the connection bar for the supply line or lines is designed in a flexible or pivotal fashion in order to intercept loads and to prevent them from being passed on to the further supply belt.

BRIEF DESCRIPTION OF THE SEVERAL VIEWS OF THE DRAWINGS

The invention will be described further by way of a preferred embodiment which is shown schematically in the drawings, wherein:

FIG. 3 shows a side view of a segment of a segmental chain of a supply belt according to the invention; and FIG. 4 shows a partially sectional side view of a trench wall cutter having a carrier device and a supply belt according to the invention.

DETAILED DESCRIPTION OF THE INVENTION

Figure 1:
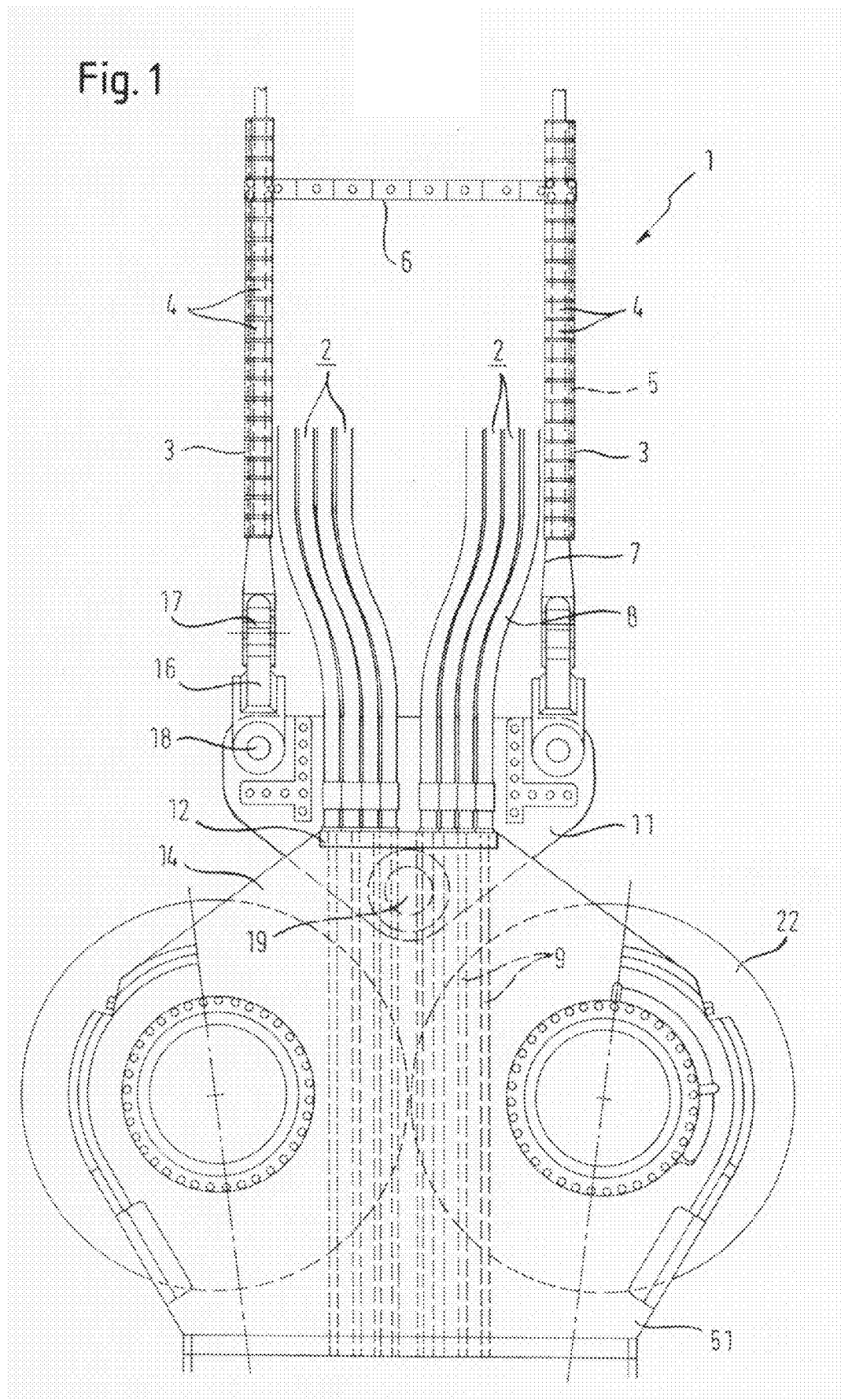
FIG. 1 shows a partially sectional side view of a supply belt according to the invention.

In FIG. 1 a sectional side view of a supply belt 1 according to the invention is shown in the area of the attachment to a device frame 14 of a trench wall cutter 51. In this embodiment the supply belt 1 is formed of two segmental chains 3 that extend substantially parallel to each other. Between these segmental chains 3 the individual supply lines 2 are provided. These can be hydraulic or electric power lines for example. Control lines can also be provided here. If the supply belt 1 according to the invention is used for the supply of a trench wall cutter 51 it may be of advantage to provide further supply lines 2 for feeding e.g. support suspension into the cut trench. Likewise, it is possible to provide lines for the removal of cut soil material.

A few meters apart, more particularly one to two meters apart, holders designed as crosswebs 6 are provided between the two segmental chains 3. These crosswebs 6 have fastenings for the supply lines 2. Each segmental chain 3 consists of a plurality of segments 4 that are substantially designed in the same way. Inside the segments 4 a guide rope 5 and a supporting rope 7 each extends. The supporting rope 7 mainly serves to bear the weight of the trench wall cutter 51 fixed thereon. The guide rope 5, that is additionally used in this case, is not necessarily required. By preference, it can be fixed to the first and last segment of the segmental chain 3, whereby the said segmental chain 3 is stabilized.

When the supporting rope 7 is wound together with the remaining supply belt 1 onto a winch drum 57, the winding and unwinding takes place synchronously. Due to the weight of the trench wall cutter 51 a stretching of the supporting rope 7 can occur. This can also be caused by a tensional force present during the extraction of the cutter from the filled trench. In order to compensate the resultant differing length of the supporting rope 7 and the remaining supply belt it is possible e.g. to connect the individual crosswebs 6 in a fixed manner to the supporting rope 7. In this way an elongation of the supporting rope 7 is directly transferred to the remaining supply belt 1. In addition, the elongation is distributed over the entire length of the supply belt so that the elongation does not lead to additional loads acting on supply lines. To this end the supply lines 2 can be fixed on the individual crosswebs 6 with a certain degree of free motion in the direction of the length of the supply belt.

In the embodiment depicted here the supply lines 2 are provided as individual hoses 8 in the area of the supply belt 1. The supply belt 1 ends at the end illustrated here in a substantially triangular terminal element 11 in the form of a rocker. On the device frame 14 a connection bar 12 is provided, on which the connection of the hoses 8 of the supply lines 2 to fixed lines 9 takes place. The lines 9 are designed as boreholes in the device frame 14 and lead to a drive unit 55 of a trench wall cutter 51 for example.

The supply belt 1 is fixed to the rocker 11 in an articulated manner with holding elements 16 that each have two eyes. These holding elements 16 are provided on both segmental chains 3 and fixed on the supporting rope 7 in order to bear the weight force of the trench wall cutter 51. In addition, the guide rope 5 can equally be attached to the holding elements 16. The supporting ropes 7 are fixed in an articulated fashion at the upper eye 17 of the holding elements 16, whereby a pivoting movement in a horizontal plane is rendered possible.

The holding elements 16 themselves are attached with their second eye in an articulated fashion to the rocker 11. The attachment is such that in each case a pivoting movement in an axis located perpendicularly to the plane of the drawing is rendered possible. Thus, the supply belt 1 is pivotably suspended with respect to the rocker 11 about two axes that are located in particular perpendicularly on one another.

The attachment of the trench wall cutter 51 is effected through the device frame 14, which is fixed on a holder 19, again in an articulated fashion, by means of hinge bolts. The aim of the diversely designed articulated attachment of the supply belt 1 via the rocker 11 to the trench wall cutter 51 is to ensure that loads, such as tilting or bending torques and shearing forces, that occur during the operation of the trench wall cutter 51, are not passed on—or only to a small degree—to the supply belt 1.

The trench wall cutter 51 partly shown here is a so-called Quattro cutter that has four cutting wheels 22, with only the two upper cutting wheels 53 being illustrated here. Such trench wall cutters are operated according to the so-called CSM-method (cutter soil mixing), in which a large part of the loosened soil material is crushed and remains in the soil for the production of the trench wall. In the case of such a CSM-cutter a conveyer hose for the drill spoil can be dispensed with. The suspension additionally needed is fed via one of the hoses of the supply belt. Together with the conveyer hose that is not required the hose winding including drive and control becomes unnecessary, too. However, in principle it is also possible to employ the supply belt 1 according to the invention with other trench wall cutting methods.

Figure 2:
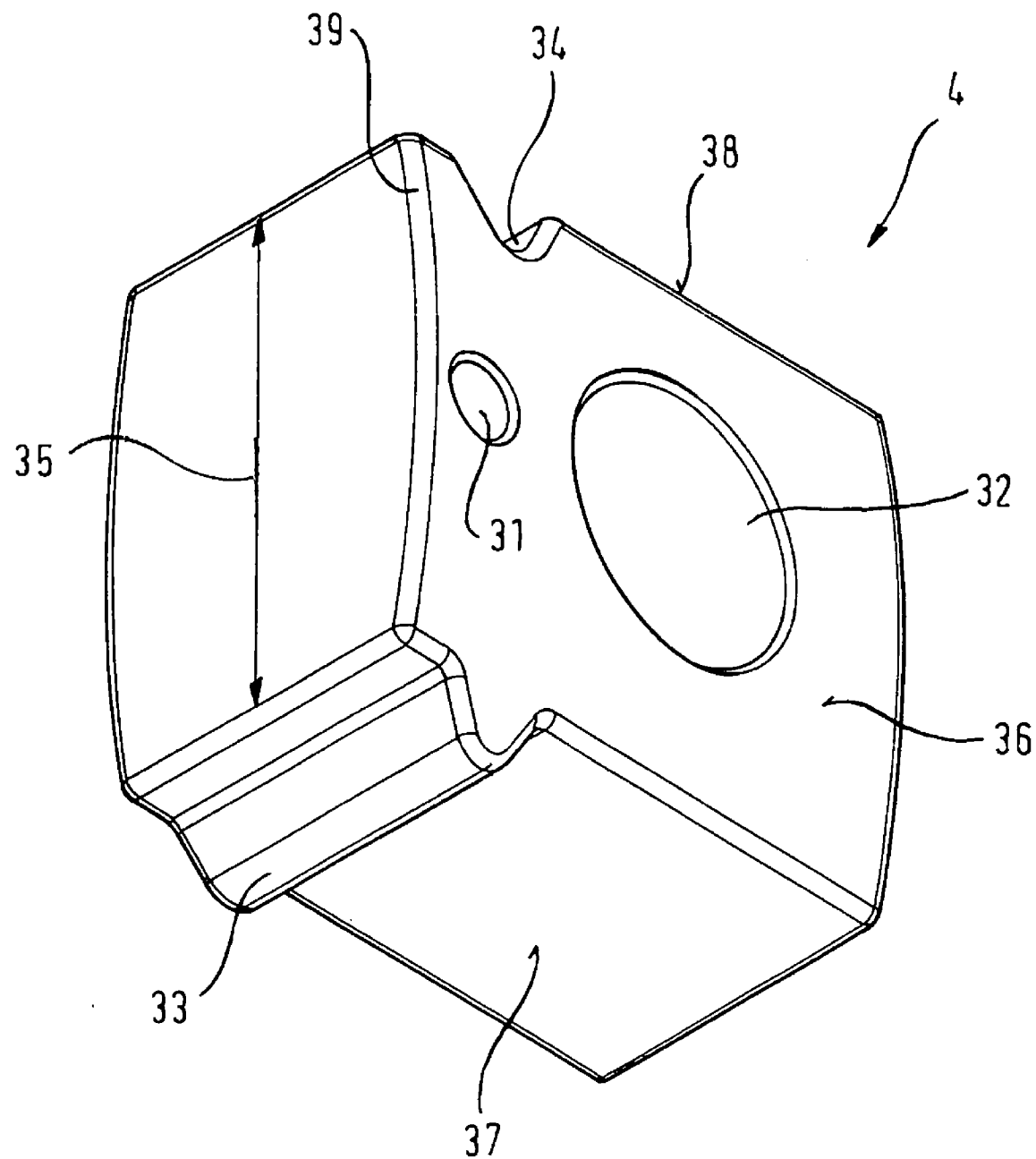
FIG. 2 shows a perspective view of a segment of a segmental chain of the supply belt according to the invention.

In FIGS. 2 and 3 a segment 4 of the segmental chain 3 is depicted. These segments consist of metal for example. The segment has two through-holes 31 and 32. The larger through-hole 32 is provided for the supporting rope 7 which bears the weight of the soil working device 51. The smaller through-hole 31 serves to pass the guide rope 5 through. This guide rope 5 serves to prevent the segments 4 from tilting during the winding and unwinding and ensures that the single segments 4 come to rest precisely on top of each other. For this purpose a guide projection 33 is additionally provided on the underside 37. On the upper side 38 a guide groove 34 complementary to the guide projection 33 is formed. During the winding of the supply belt 1 the projection and the groove ensure that the individual windings of the supply belt 1 are located precisely on top of each other. In addition to the accommodation of the guide rope 5 and the supporting rope 7 the segments 4 also ensure that the supply lines 2 do not squeeze each other in the wound state. To this end the supply lines should not exceed a maximum height of the spacing 35 of a segment 4.

To minimize wear during the winding of the segments that consist for instance of a solid aluminum alloy it is intended that at least the lateral faces 36 have a convex shape. As a result, the single segments 4 or respectively their surfaces can roll off better along each other and wear caused by sliding friction is prevented. Furthermore, the edges 39 of the segment 4 are rounded-off.

In FIG. 4 a trench wall cutter 51 with a carrier device 52 belonging thereto is shown. The carrier device is designed as a crawler type vehicle 52. On the crawler type vehicle 52 a winch drum 57 with a drive that cannot be seen here is provided. The winch drum 57 serves to accommodate and control the supply belt 1 with the supporting rope 7. The supply lines 2 are connected at one end via connections 58 to the respective supply, such as the power supply of the crawler type vehicle 52.

At the other end of the supply belt 1 a trench wall cutter 51 is located that is connected via a rocker 11 to the supply belt 1. The trench wall cutter 51 depicted here has upper 53 and lower 54 cutting wheels. Between these cutting wheels the drive unit 55 is located, up to which the supply lines 2 of the supply belt 1 are guided as tube pipes. To align the trench wall cutter 51 a mast 62 with a deflection 63 is mounted on the crawler type vehicle 52. Through this deflection 63 the supply belt 1 is deflected into a vertical direction. The alignment of the mast 62 is rendered possible by an adjusting device 64 which is of hydraulic design in this embodiment. By making use of the supply belt 1 according to the invention the winch drum unit for the supporting rope 7 becomes unnecessary. As the supporting rope 7 and the remaining supply lines 2 are now kept on one winch drum 57, the complex synchronization of two different winches and their drives can be dispensed with.

As a result of the supply belt in accordance with the invention the operation of soil working devices is rendered possible in a particularly efficient manner.

The invention claimed is:

1. Supply belt for the supply of a soil working device, comprising
 at least one supply line,
 two guide ropes,
 two segmental chains formed of a plurality of segments, wherein the segments of each chain are lined up on one of the guide ropes, and wherein each of the segments is provided with receiving spaces therein,
 two supporting ropes, and
 holders which are spaced apart from each other and attached on segments of the segmental chain and configured for holding the at least one supply line along the segmental chain, wherein the holders are configured as crosswebs that extend between the two segmental chains and connect the two segmental chains to each other, wherein
 the two supporting ropes and the two guide ropes are guided along the segmental chain in the receiving spaces of the segments.

2. Supply belt according to claim 1,
 wherein
 the segments have convex lateral faces for reducing friction therebetween during winding and unwinding of the segmental chain.

3. Supply belt according to claim 1,
 wherein
 the segments have guide projections on one side and guide grooves complementary thereto on an opposite side, for guiding winding of the segments in a superposed fashion.

4. Supply belt according to claim 1,
 wherein
 the receiving spaces in the segments in which the two supporting ropes are guided are configured as through-holes.

5. Supply belt according to claim 1,
 wherein
 the at least one supply line comprises one of an electric line, a hydraulic line, a control line, and a conveyer line.

6. Supply belt according to claim 1,
 wherein
 the at least one supply line has a thickness which does not exceed the height of the segments.

7. Supply belt according to claim 1,
 wherein
 the supply belt has two ends and a terminal element provided at least on one of the ends, and
 the two supporting ropes are attached on the terminal element in an articulated manner.

8. Supply belt according to claim 7, further comprising a connection bar configured for arrangement on a device frame,
 wherein
 the at least one supply line terminates in the connection bar.

9. Supply belt according to claim 7,
 wherein
 the terminal element has at least one fastening device configured for mounting a working tool.

10. Soil working device,
 including
 a supply belt according to claim 1.

11. Soil working device according to claim 10,
 further comprising a winch including a winch drum for winding the supply belt.

12. Soil working device including a supply belt according to claim 7, further comprising a device frame having an upper point of articulation,
 wherein
 the terminal element comprises a rocker, and wherein the rocker is pivotably arranged at the upper point of articulation of the device frame.

13. Soil working device according to claim 10, wherein the soil working device is a trench wall cutter.

* * * * *